US008056005B2

(12) United States Patent
Giannetti

(10) Patent No.: US 8,056,005 B2
(45) Date of Patent: Nov. 8, 2011

(54) COMPOSING A MACHINE READABLE DOCUMENT TEMPLATE

(75) Inventor: Fabio Giannetti, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 680 days.

(21) Appl. No.: 12/174,984

(22) Filed: Jul. 17, 2008

(65) Prior Publication Data

US 2009/0024917 A1 Jan. 22, 2009

(30) Foreign Application Priority Data

Jul. 20, 2007 (GB) .................................. 0714077.5

(51) Int. Cl.
*G06F 17/00* (2006.01)
(52) U.S. Cl. ........................................ 715/248; 715/255
(58) Field of Classification Search .................. 715/255, 715/243, 249, 253, 271, 235, 241
See application file for complete search history.

(56) References Cited

U.S. PATENT DOCUMENTS

| 7,815,101 | B2 * | 10/2010 | Shafer ........................... 235/375 |
| 7,853,472 | B2 * | 12/2010 | Al-Abdulqader et al. ... 705/7.13 |
| 2002/0194219 | A1 * | 12/2002 | Bradley et al. ................ 707/506 |
| 2003/0220871 | A1 * | 11/2003 | Clarke et al. .................... 705/40 |
| 2004/0111673 | A1 * | 6/2004 | Bowman et al. ............... 715/513 |
| 2004/0205469 | A1 * | 10/2004 | Mellor ........................... 715/500 |
| 2005/0193334 | A1 | 9/2005 | Ohashi et al. |
| 2006/0041443 | A1 * | 2/2006 | Horvath ........................... 705/1 |
| 2006/0195778 | A1 * | 8/2006 | Bendik ......................... 715/500 |
| 2007/0106687 | A1 | 5/2007 | Dailey |
| 2008/0144130 | A1 * | 6/2008 | Kerigan et al. ............... 358/474 |
| 2010/0257442 | A1 * | 10/2010 | Kembel et al. ................ 715/234 |

OTHER PUBLICATIONS

Fraternali, Piero, et al, "Model-Driven Development of Web Applications: the AutoWeb System", Transactions on Information Systems (TOIS), vol. 18, Issue 4, Oct. 2000, pp. 323-382.*

* cited by examiner

*Primary Examiner* — Laurie Ries

(57) ABSTRACT

A method and apparatus is described for composing a machine readable document template having a portion for inclusion of data content. The method and apparatus comprise generating a formatting rule applicable to data content for inclusion in the data content portion and storing the rule separately from the data content portion.

14 Claims, 10 Drawing Sheets

Fig. 2

| FIELD 200 | VALUE 202 | TYPE 204 |
|---|---|---|
| NAME | .... | TEXT |
| BALANCE | .... | TEXT |
| ADDRESS | .... | TEXT |
| CUSTOMER-ADVISOR NAME | .... | TEXT |
| CUSTWEBPAGE | .... | TEXT |
| BRANCH-PHONE | .... | TEXT |
| PICTURE1 | .... | IMAGE |

FIG. 6

| Dear <<name>>
104 | <Picture1>
622 |

Your account balance is: £[Balance<<balance>>]Balance
606

[CustGenderWe will forward your statement to you at: ]CustGender
608

[AddrLength [CustGender <<address>>] CustGender] AddrLength
610

Your customer adviser is <<cust-advisor-name>>; <HeOrShe> will take care of all your needs.
612

For more information please access the following webpage at <CustWebPage>
616

Please contact your nearest branch at <BranchPhone> for any further enquiries
618

Yours sincerely,

<<cust-advisor-name>>
120

FIG. 7

| RULE NAME 700 | RULE DETAILS 702 | RULE ID 704 | RULE TYPE 706 |
|---|---|---|---|
| BALANCE | .... | .... | TEXT |
| ADDRLENGTH | .... | .... | TEXT |
| CUSTGENDER | .... | .... | TEXT |
| HEORSHE | .... | .... | TEXT |
| CUSTWEBPAGE | .... | .... | TEXT |
| BRANCHPHONE | .... | .... | TEXT |
| PICTURE1 | .... | .... | IMAGE |

FIG. 8

| FIELD 800 | VALUE 802 | TYPE 804 |
|---|---|---|
| NAME | .... | TEXT |
| BALANCE | .... | TEXT |
| ADDRESS | .... | TEXT |
| CUSTOMER-ADVISOR NAME | .... | TEXT |
| CUSTWEBPAGE | .... | TEXT |
| BRANCH-PHONE | .... | TEXT |
| PICTURE1 | .... | IMAGE |
| GENDER | MALE/FEMALE | |
| HELVETICA | HELVETICA | FONT |
| TIMES | TIMES | FONT |
| CUSTOMERADVISORGENDER | MALE/FEMALE | |
| AGE | | |
| CHILD.JPG | | IMAGE |
| ADULT.JPG | | IMAGE |
| | | |
| | | |

COMPOSING A MACHINE READABLE DOCUMENT TEMPLATE

This application claims priority from Great Brian Patent Application 0714077.5, filed on Jul. 20, 2007. The entire content of the aforementioned application is incorporated herein by reference.

FIELD OF THE INVENTION

The invention relates to a method and apparatus for composing a machine readable document template

BACKGROUND OF THE INVENTION

A known machine readable document template is available in the "Yours Truly Designer" (YTD) product available from IPG-IDP Hewlett Packard Company. The machine readable document template includes a plurality of fields which may require modification. However in the known arrangement it is difficult to derive from a modified template that modification has taken place, or what the modification is. In addition there is limited flexibility as to the types of modification available.

BRIEF SUMMARY OF THE INVENTION

A method and apparatus are described for composing a machine-readable document template. The template includes a portion for inclusion of formattable data content. A formatting rule applicable to the data content portions is generated and is separately stored from the data content portion.

BRIEF DESCRIPTION OF THE INVENTION

Embodiments of the invention will be described, by way of example, with reference to the drawings, of which:

FIG. 2 is a table showing data stored in a content database;

Figure 4A:
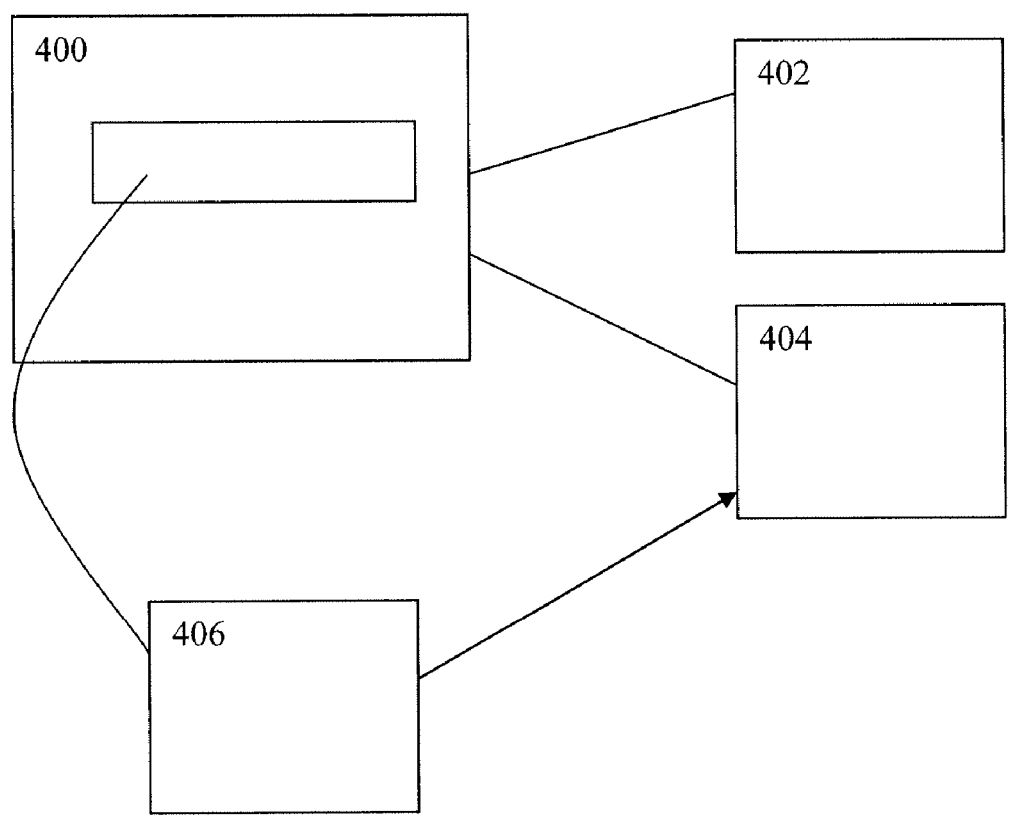
Figure 4B:
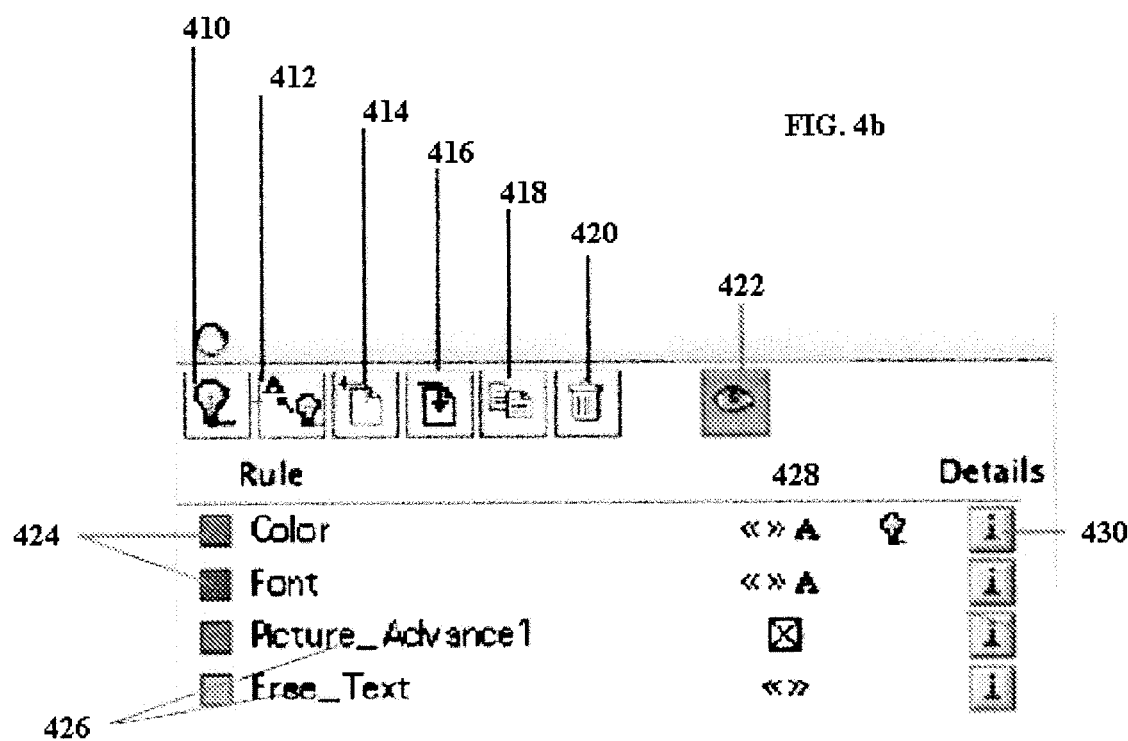
Figure 5:
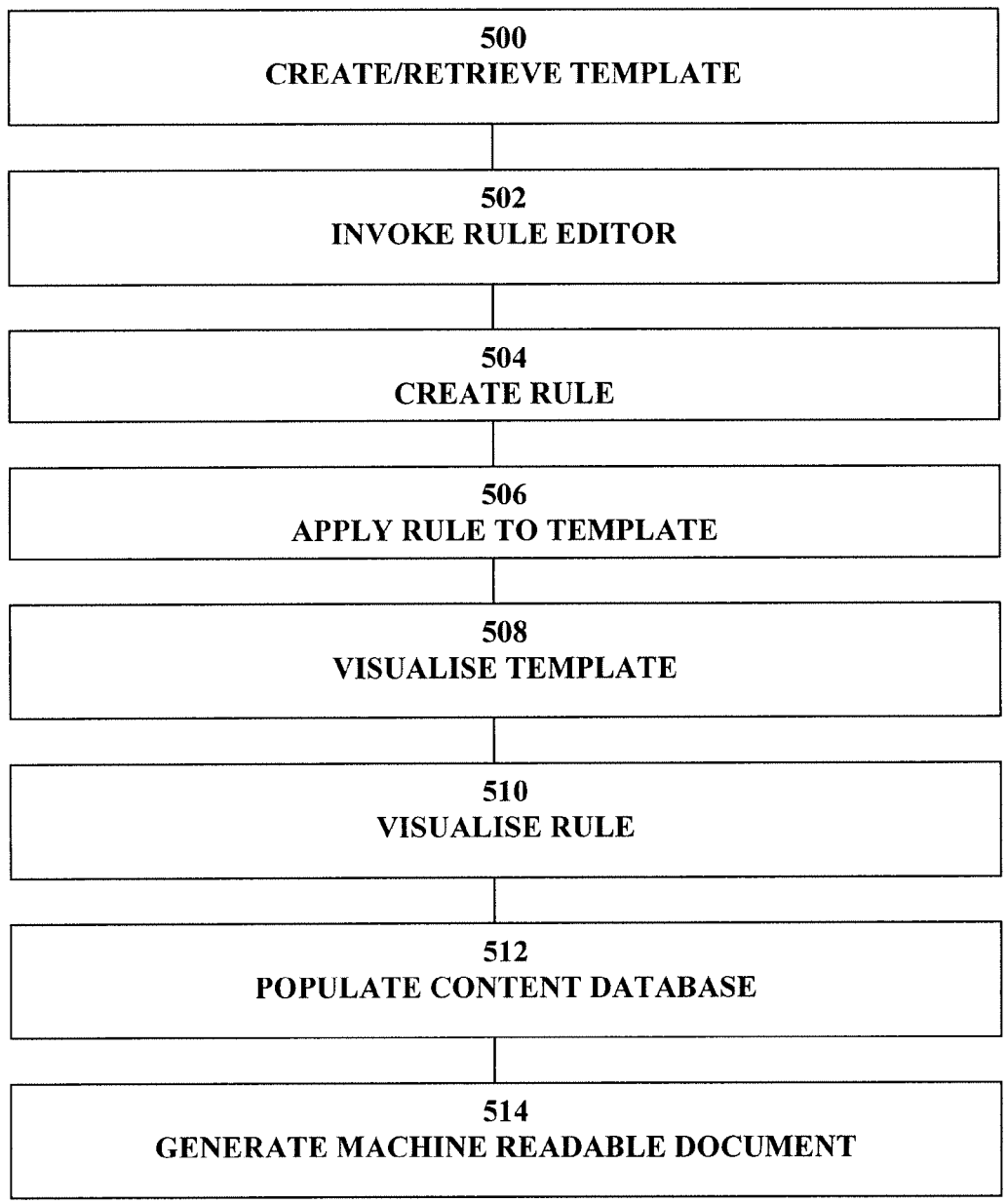
Figure 9:
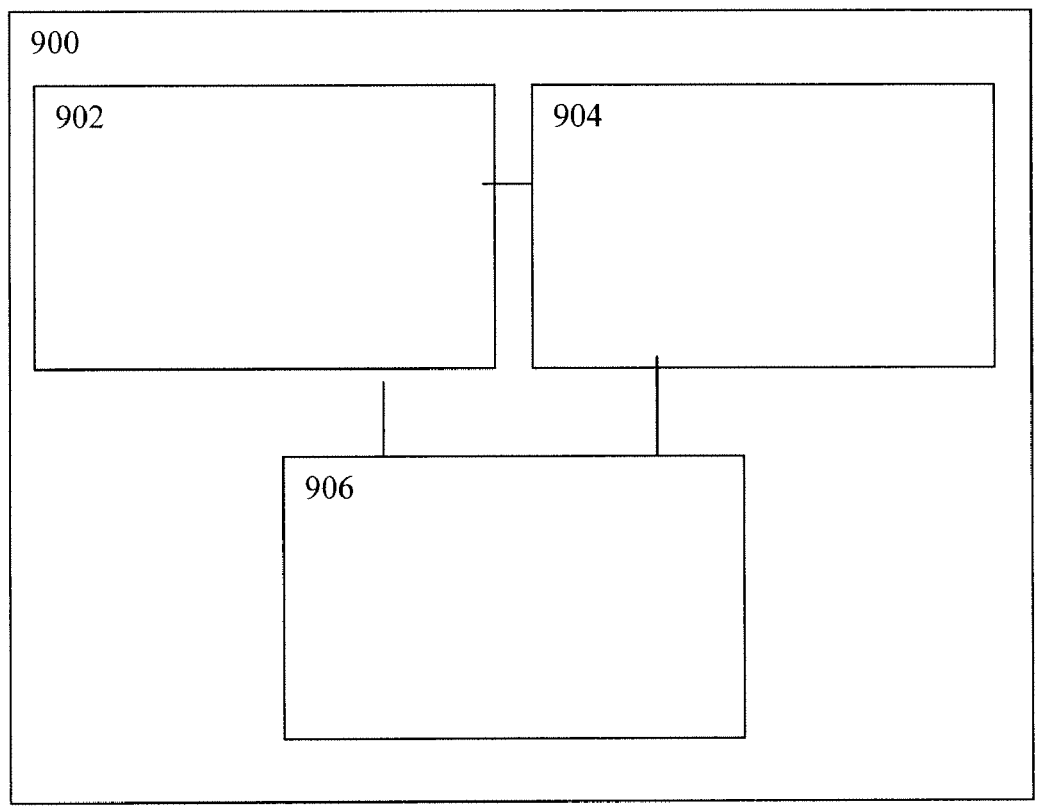

FIG. 4*a* is a block diagram showing an architecture according to the approach described herein;

FIG. 4*b* shows, schematically, a rules palette;

FIG. 5 is a flow diagram showing steps involved in implementing the approach described herein;

FIG. 6 is a diagram showing a modified machine readable document template according to the approach described herein;

FIG. 7 is a table showing data stored in a rules database according to the approach described herein;

FIG. 8 is a table showing data stored in a content database according to the approach described herein; and FIG. 9 is a block diagram illustrating a computer architecture by which the approach described herein can be implemented.

DETAILED DESCRIPTION OF THE INVENTION

The method and apparatus described herein comprise various aspects which are first described in overview below. Aspects of the approach can be implemented separately and independently of one another or two or more of the approaches can be implemented in conjunction with one another as appropriate.

Figure 1:
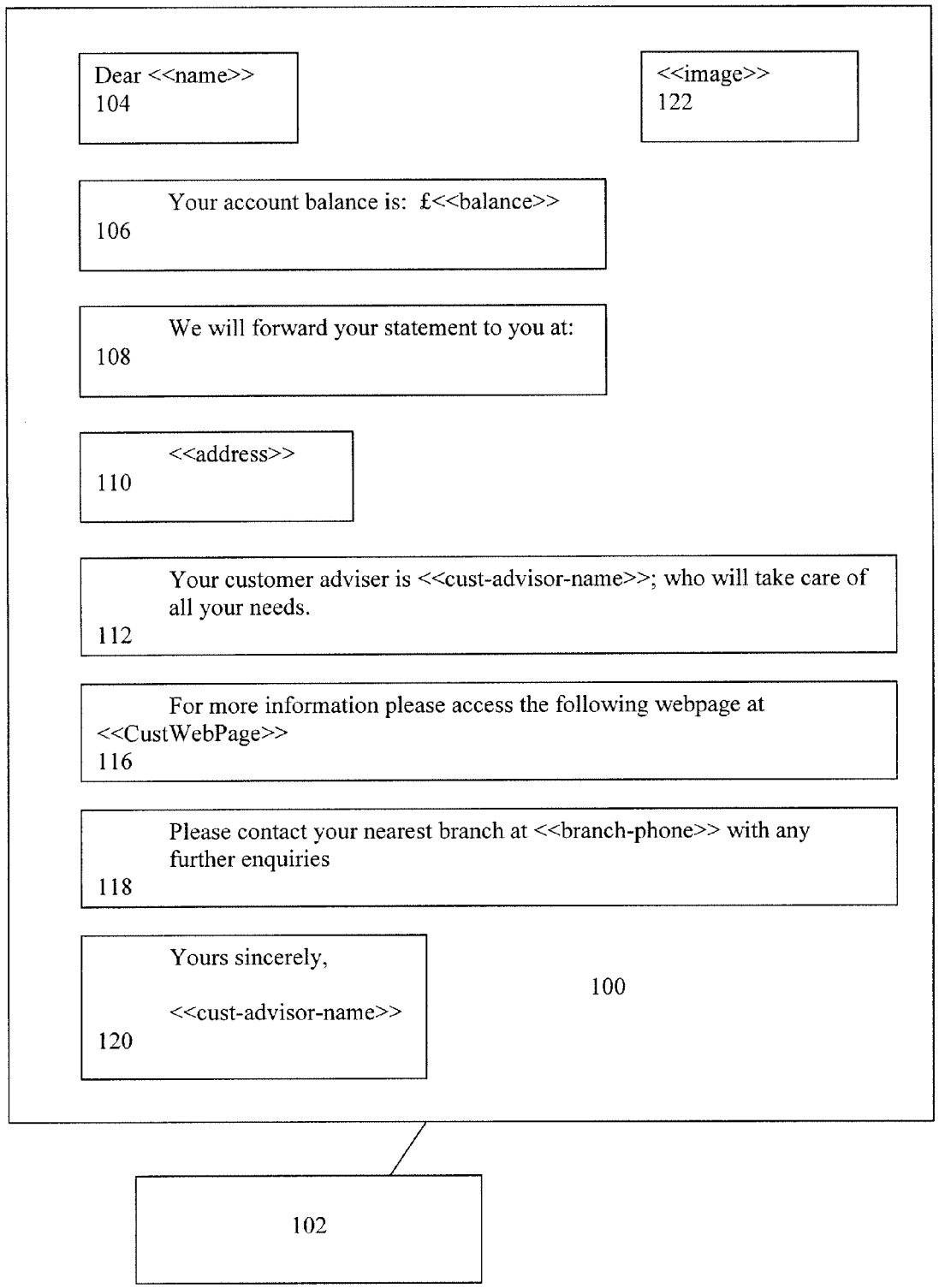
FIG. 1 is a diagram showing an example of a modifiable machine readable document template.

Referring to FIG. 1 an initial machine readable template document is shown, by way of background. A machine readable document comprises a machine readable representation processable to provide an output such as a user viewable document. The document can include, for example, machine readable tags denoting the start and finish of an area or portion designating content such as text or image content. Machine readable documents can be processed as part of a print pipeline to provide an eventual print output.

A machine readable document template forms one of the first stages in the print pipeline and comprises a template including tagged or marked up locations for insertion of data from other sources. The template comprises a document having static and/or variable content, the variable content being extractable from a remote location such as a content database or web resource. To create a machine readable document from the machine readable document template, the template is bound with the appropriate variable data content. The machine readable document can then be further processed to obtain a user viewable document. The variable data can, for example, take the form of formattable data content fields or copy-holes which are formattable according to a formatting rule.

In the YTD known approach the template, sometimes termed an authored template, has portions known as channels for inclusion of both static and variable content, the content comprising for example image or text content and variable content being inserted into a field or copy-hole.

Referring in more detail, therefore, to FIG. 1, a machine readable document generally designated 100 can, for example, comprise a communication to an end user which has both static and variable content in text and image channels, the variable content being retrievable from a content database 102. Variable content or data is provided in the form of a database field which is recognisable by the notation <<field>>. Accordingly it can be seen that in the template FIG. 1, such field fields include <<name>>—the name of the recipient of the communication, <<image>> an image to be applied in the communication, <<balance>>—a value for the recipient's bank balance, <<address>>—the recipient's address, <<cust-advisor-name>>—the customer advisor's name, <<CustWebPage>> the issuer's web page, and <<branch-phone>>—the issuing branch's telephone number.

Hence the template 100 includes text channels 104, 106, 108, 110, 112, 114, 116, 118, 120 and image channel 122. Text channel 104 comprises the salutation "Dear" <<name>>. Text Channel 106 comprises static information "your current account balance is: £" <<balance>>. Text channel 108 includes static content "We will forward your statement to you at:". Text channel 110 includes variable content data field <<address>>. Text channel 112 includes the static content "Your customer advisor is:" followed by the field <<cust-advisor-name>>, followed by further static data ",who will take care of all your needs". Text channel 116 includes static information "For more information please access the following webpage at" followed by field <<CustWebPage>>. Text channel 118 includes static data "Please contact your nearest branch at" followed by field <<branch-phone>> followed by static text "for any further enquiries". Text channel 120 includes the signoff "Yours sincerely," followed by the field <<cust-advisor-name>>. Image channel 122 includes the field <<image>> which may be, for example, a logo of the organisation sending the communication.

Referring to FIG. 2 it will be seen that in the content database each of the fields is identifiable by the respective field name in column 200 and an associated value (not shown in detail) is provided in column 202 such as the actual customer name, balance value, address details, customer advisor name and so forth. Further still in column 204 the type of data in the field is indicated as being one of text or image data.

In order to generate a machine readable document directed to a specific customer with all of the correct details introduced, the machine readable document template is bound with the variable data from the content database. According to known approaches where it is desired to modify the template—for example by adding a rule that the balance value is shown in a different colour, a rule is applied. For example the rule may be that the value of balance has a certain font and size and a colour red.

Figure 3:
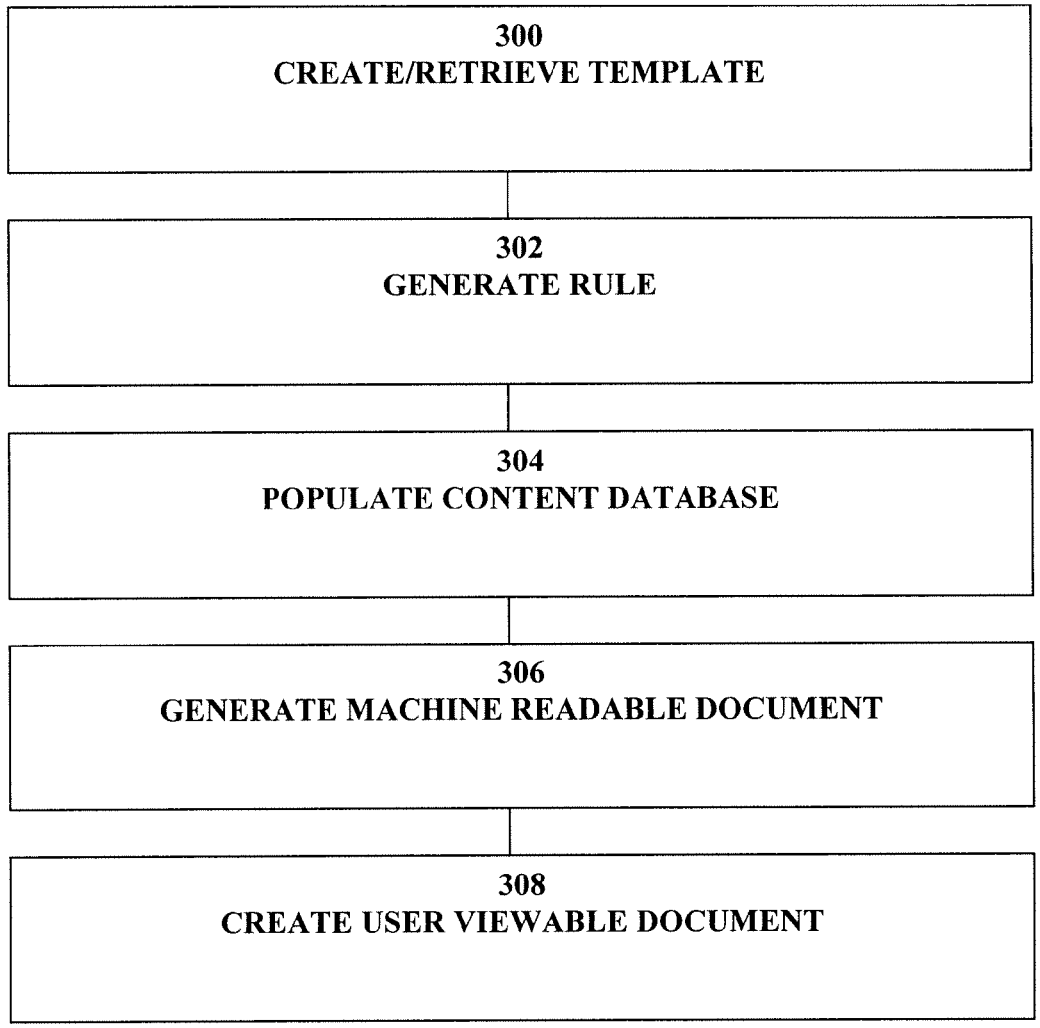
FIG. 3 is a flow diagram showing steps involved in modifying a machine readable document template according to a known approach.

In the conventional approach, therefore, the steps displayed in FIG. 3 are implemented to generate the machine readable document from the modified template. At step 300 the machine readable document template is retrieved from an existing version or created for a new version. At step 302 the rule is created for example requiring that the balance is displayed in red with specified font and size. The content database is populated fully with values for all of the fields at step 304 and at step 306 the machine readable document is generated by binding the variable data to the template. The rule is applied evaluating the values of the relevant fields in the database and the appropriate value is updated in the document as a result in the hosting application document format. The rules can be added to the template or evaluated during binding to create a fully merged final document. A user viewable document can then be created from the machine readable document using any appropriate user interface.

As a result it will be seen that the output document will be a communication addressed to specifically to the recipient, with the desired image displayed, and with the static text content such as "Your account balance is:" together with the variable information such as the value of the balance, displayed according to the rule together with the other tailored information for the user.

According to this known approach, however, because the field and rules are interconnected there is limited flexibility available for modification of the template and a requirement for repeated rule creation for each field. Furthermore once a rule is applied to an existing field it is difficult, from viewing the template alone, to assess where the rule has been applied or what it is. Yet further, if the modification comprises replacement of a variable field with a static field, the database field name will still be seen on the template itself. For example if in text channel 116 it is decided that the same customer webpage address can be sent to all users then the rule may be changed to simply insert the common address details. However this will still appear as a variable content data field in the template itself.

According to the approach described herein an alternative template composition/modification approach is described providing a flexible and user-understandable approach. Referring to FIG. 4 a machine readable document template 400 is provided in conjunction with both a content database 402 and a rules editor 406 which can be called up from the template and used to populate the rules database.

As described in more detail below, rules are created having different types for application to different channels, but which may be reused for different content. Yet further the modifications can be visualised by the user by adjusting the manner in which they are displayed. The new paradigm creates three types of rules:

Style: this rule is responsible for changing any typesetting capabilities of the text, like font-family, font size, and so on and can be applied to text copy-holes, or text channels;

Text: this rule is responsible for changing the content in a text channel. The rule can be applied multiple times in the same and/or different channels and enables the insertion of static content alternatives and/or content from database fields;

Image: this rule is responsible for changing the content in an image channel. The rule can be applied multiple times but only in separate channels and enables the insertion of fixed image alternative or image pointers from the database.

As a result a clear separation is provided between rules and fields, the fields simply being place holders in the template for the content coming from the database, which is unfiltered. The rules instead have the task of filtering the content and applying the appropriate logic or rule requirements. Yet further there is clear distinction between different rules such that style rules only act on style, and text and image rules similarly act on their respective content types. Further the user is provided with an easy understanding of and feedback on the application of the rules and their results with the machine readable document template including how the rules are applied, and what each rule is doing. Similarly it is possible to identify the field or portion affected by the rule simply from reviewing the template in the authoring environment. Rules can be combined together making complex effects from multiple simpler rules for example by allowing separation and nesting of style and content rules.

The steps implemented according to the approach as described herein can be further understood with reference to FIG. 5. At step 500 the template is created or retrieved and at step 502 a channel or other formattable data content portion is selected in any appropriate manner for example by clicking on the relevant portion which invokes the rules editor.

At step 504 the rule is created via the rule editor including a rule name, rule identifier allowing the rule to be identified by the user on the template, rule type and the actual rule requirement specifying what happened according to the rule. The rule identifier may be, for example, any visual indicator which can be distinguished visually on the machine readable document template as signifying application of the rule to the relevant template portion. In addition, different identifiers are applied to respective rules further allowing the user to distinguish between rules, and to retrieve the rule corresponding to a specific identifier. For example this may be achieved by attributing distinguishable symbols to the relevant portion or element. The identifier differs dependent on the rule type for the purposes of ease of understanding, in the embodiments described herein, the identifier for example for a style rule having a given name comprises a square bracket symbol [ ] with, as a subscript, the rule name, but it will be appreciated that this is not necessarily the approach used in practice. For example merely colouring the square brackets with the different colours would suffice. Once a rule type is set the possible values that the rule can expressed are fixed as well. Based on the rule type the rule can be applied to either a text copy-hole (style and text) or an image copy-hole (image).

At step 506 the rule is applied to the template such as that, when the template is bound to the data the rule will be retrieved and applied as appropriate. In addition those portions or elements of the templates to which the rule is applied can be identified from the visualisation information such as, in the case of a style rule the identifier $[\ ]_{rule\ name}$.

At step 508, therefore, when the user subsequently displays the machine readable document template in any visualisation format for example on a GUI or on paper, it is possible to identify which portion is affected by a rule, and also derive information concerning what the rule is. For example by clicking on, or passing the cursor over the identifier, the rule can be displayed.

Accordingly, at step 510 the rule itself can be displayed either as an extract from the rules database or in a rendered version such as a rule palette generated by the rule editor of the type shown in FIG. 4*b* including a "new rule" icon 410 for generating a new rule, icons 412, 414 416, 418, 420 for assigning a rule to a field, exporting a rule, importing a rule, duplicating a rule and deleting a rule respectively. Icon 422 allows selection of whether the rule identifier is hidden or shown on the template channel. Details of the available rules can be seen including the rule colour (or other identifier) 424, rule name 426, rule type 428 including identifier type (<<>>or <>) and rule type (text icon, or an image icon) and rule information or requirements 430. In conjunction with this, when a new rule is created or an existing rule edited a suitable screen is called up providing functionality including name, colour (or identifier) and type dropdown menus and a text area for writing the rule with the option of selecting predetermined functions (for example Boolean operations or other predefined functions), variables such as existing field names, attributes such as colour, font, and operators such as <<,>>,>=to form part of the rule requirements.

At step 512 the content database is populated with the required data for binding with the template. For example this may be done by presenting a screen to the user asking for completion of various fields corresponding to the variable content fields. At step 514 the machine readable document is generated by binding the data with the template. During the binding process as each rule identifier is encountered the relevant rule is retrieved according to the rule identifier, and the rule requirements are applied. For example the template and data can be bound using any appropriate known approach as long as the approach is able to recognise the rule identifier, retrieve the corresponding rule and apply it to provide a machine readable document. For example this can be achieved using known markup-language and extensible style sheet language (XSL) techniques.

Of course a user viewable version of the machine readable document can then be generated in any appropriate manner for communication to the user.

The manner in which the approach is implemented can be further understood with reference to the example discussed below with reference to FIG. 6 which shows the example template of FIG. 1 modified according to the approach described herein.

Turning firstly to application of style rules, such rules can be applied to for example, static text, static text and fields or fields alone and, as discussed in more detail below, can be nested or applied to different intervals. The rules can apply to text parameters such as typesetting capabilities, for example font family, font size and so forth. To allow visualisation the portion or element to which the rule is applied is denominated, in the example discussed, by an identifier [ ]$_{rule\ name}$ as discussed above. The manner in which the rules are formulated is discussed below but the visualisation can be understood with reference to FIG. 6, where the channels shown in FIG. 1 are shown with like reference numerals relating to unmodified portions. Text channel 606, for example, shows how a style rule applied to a field can be identified by the symbol [ ]$_{balance}$ either side of the field <<balance>> indicating that the rule "balance" is applied to that field, the rule itself being retrievable by mapping the identifier to the rule database.

The manner in which a style rule applied to a static field can be visualised can be seen in text channel 608 where the static text "We will forward your statement to you at:" has rule identifier [ ]$_{CustGender}$. It will be seen that in a similar manner a style rule applied both to static text and a field could be applied in the case, for example, of field 104 by providing [ ]$_{rule\ name}$ around the contents of the text channel "Dear <<name>>".

Turning to text channel 606 in more detail, it will be seen that the rule identifier [ ]$_{balance}$ is applied to the field <<balance>>. The corresponding rule can be expressed in any appropriate format that may take the form:

| | |
|---|---|
| | IF(START_WITH(FIELD("balance"),"-")) |
| Rule Name: Balance | THEN(COLOUR("Red")) |
| Identifier: [ ]$_{Balance}$ | ELSE(COLOUR("Black")) |

When this rule is then applied to the text channel 606 and relevant part thereof it will be seen that the template appears as shown in FIG. 6, where the rule is applied to the balance field such as the balance field such that the balance value would appear in red and the remainder of the channels would appear in black. The rule can be re-used as often as required even across different templates, by using export and import rules the functionality, requiring only specification of where it is used. When an element is selected for application of a rule only rules of appropriate type are available.

In practice the identifier [ ] may simply be coloured the appropriate colour to highlight the fact that a style rule has been applied to this interval of content allowing the user to immediately check what the result would be by looking at the corresponding "colour" rule in the rule palette.

Referring now to text channel 610 it will be seen that the rules applied to a template element or portion such as <<address>> (although this can be any combination of static and variable text) can be nested or even applied to different intervals. For example the rules "AddrLength" and "CustGender" may be expressed as:

| | |
|---|---|
| | IF(LENGTH((FIELD("address"))>20)) |
| Rule Name: AddrLength | THEN(FONT("Helvetica"), SIZE ("15pt")) |
| Rule identifier: [ ]$_{AddrLength}$ | THEN (FONT("Helvetica"),SIZE"20"pt)) |
| | IF((FIELD("gender") = "male")) |
| Rule Name: CustGender | THEN (FONT("Helvetica")) |
| Rule Indentifier: | ELSE (FONT("Times)) |
| [ ]$_{CustGender}$ | |

This allows different type setting styles to be applied together, for example a font size change and font family change (in the example shown) or a change of colour and so forth together with one rule overriding depending on the circumstances. Where the rules AddrLength and CustGender are applied to field 610 then on reference to an additional field "gender"—a field that is populated according to the gender of the recipient—the font is Helvetica for "male" but Times otherwise. In the case of text channel 610, then the AddrLength rule will determine the font size but may be overridden as regards the font family by the inner nested CustGender rule. In particular the possible results of the address are:

| |
|---|
| address<20 characters and male customer = Helvetica, 20pt |
| address>20 characters and male customer = Helvetica, 15pt |
| address<20 characters and female customer = Times, 20pt |
| address>20 characters and female customer = Times, 15pt |

Referring to FIG. 7—therefore the contents of a rules database can be understood in more detail. In column 700 the rule name for example "balance", "AddrLength", "CustGender" are provided and in column 702 the rule requirements (not listed in detail) are incorporated. In column 704 the rule identifier for example [ ]$_{balance}$ and so forth corresponding to the rule name is provided in column 706 the rule type for example "style", "text" or "image" as appropriate is listed. As a result the rules are stored in a separate location from the contents database and separable from any specific data field or other content such that enhanced flexibility is provided, the rules are more easy to retrieve and can be applied to multiple instances simply by invoking the same rule identifier on any instance where it is required.

In addition the content database discussed with reference to FIG. 2 is modified as shown in FIG. 8 with field name column 800, field value column 802, and field type column 804, and additional fields to support the additional rule complexity indicated above. For example as the CustGender rule requires the value of the field "Gender" this field is added to the content database together with other required fields as discussed herein.

The manner in which text rules can be implemented and applied can also be understood with reference to the modified template of FIG. 6 and the rule and content database of FIGS. 7 and 8.

Turning to text rules, these can change the content of the text channel in different ways. For example the rule can be applied multiple times in one or more different channels and can enable the insertion of static content alternatives or content from database fields as required. For example turning to text channel 612 it will be seen that the previous static text "who will take care of all your needs" has been modified with a rule name "HeOrShe" such that it now reads "<HeOrShe> will take care of all your needs". It will be seen, therefore, that the identifier for the text rule is of a different format to a style rule—in the example shown a single chevron wrapped text element is used, where the chevron can be coloured or otherwise made visually distinguishable to the user using a rule colour and contain the rule name. Of course just the colour or just the rule name are sufficient in this case to identify the rule such that providing both is not essential.

By use of a different type of identifier format, for example a single chevron rather than a square bracket—the fact that the rule is a content-type rule rather than a format-type rule is immediately derivable. Furthermore the alternative identifier type is distinguishable from the field identifier even though text of some nature must be inserted into the location. In particular the text rule identifier indicates that there is not a direct connection with the content database but instead the rule governs what text is to be inserted. For example the rule HeOrShe may be expressed:

| | |
|---|---|
| | IF(NOT(FIELD("CustomerAdvisorGender") = "Male")) |
| Rule Name: HeOrShe: | THEN(TEXT("he")) |
| Rule Colour: Blue: | ELSE(TEXT("she")) |

Hence that once the field "CustomerAdvisorGender" is examined in the content database of FIG. 8 and shows the value "male" then the text to be inserted at the rule location on the template is "he". Otherwise it is "she". It will be seen that the rule can be applied multiple times within a data channel or within multiple data channels where, in the letter, there are multiple references to the customer advisor in the third person. It will further be seen that the text rule and style rule can be used in conjunction, for example by placing a style rule identifier [ ] around the text rule identifier <>.

According to another text rule approach, the rule can allow selection between static content within the rule, or content from a database field. It can be understood with reference to text channel 616 where a rule <CustWebPage> with red chevrons replaces the previous field <<CustomerWebPage>>. In this case the rule can be expressed:

| | |
|---|---|
| | IF(NOT(FIELD("CustomerWebPage") = "")) |
| Rule Name: CustWebPage | THEN(FIELD("CustomerWebPage")) |
| Rule Colour: Red | ELSE(TEXT("http://www.hp.com")) |

Hence it will be seen that if the field "CustomerWebPage" is populated then the value of that field will be extracted from the content database and inserted into the template but otherwise the static text "http://www.hp.com" will be inserted.

In a similar manner with reference to text channel 618, an existing field <<branch-phone>> can be replaced by a rule which filters the field content first for example <BranchPhone> with purple chevrons having the rule requirements:

| | |
|---|---|
| | IF(NOT(FIELD("branch-phone") = "")) |
| Rule Name: BranchPhone | THEN(FIELD("branch-phone")) |
| Rule Color: Purple | ELSE(TEXT("+44 117 1234567")) |

In this case if the branch-phone fails and the content database is not populated then a default telephone number will be inserted.

In the case of image rules, the same or similar behaviour to text rules can be implemented although typically there will only be one image per image channel. For example in the case of channel 612 in FIG. 6, the field <<image>> can be replaced by <picture 1> with green chevrons according to a rule having the format:

| |
|---|
| Rule Name:   Picture 1 |
| Rule Color: Green |
| IF(FIELD("Age")<"17") |
| THEN(IMAGE("child.jpg")) |
| ELSE(IMAGE("adult.jpg")) |

As a result it will be seen that the selective image in the image channel will depend upon the value of the field "age" such that an image for a child or adult user can be incorporated as appropriate.

Of course in all of the examples discussed the nature of the rule can be appropriate manner. For example nested style or text rules can be applied in conjunction with each other and the multiple style text rules can apply within a of any simplicity or complexity and multiple rules can be combined in any single data channel. Additionally the same rule can be applied in multiple locations.

The steps and approaches described above can be implemented in hardware or software as appropriate. For example referring to FIG. 9 a computer designated 900 includes a processor component 902, a memory component 904 and user interface component 906. In operation therefore, upon activation via the user interface, the processor either allows creation of or retrieves a template from memory stores created rules in a rule database stored in the memory, populates content in a content database stored in the memory and generates a machine readable document and/or user viewable document as described in more detail above. The instructions themselves stored in or on any computer readable medium and can be implemented in any appropriate manner for example using xml and java script or any other appropriate computer language.

The approach described herein can be applied to any appropriate form of machine readable document and rules of any complexity or type as well as content of any nature using any appropriate computer and computer program, processor and memory or database structure.

It will be appreciated that any appropriate programming approach can be adopted or implemented in the steps described in the various aspects above and that the steps can be implemented in any appropriate manner and order as appropriate.

The invention claimed is:

1. A method of composing a machine readable document template having a portion for inclusion of data content comprising:
    generating a formatting rule applicable to data content for inclusion in the data content portion, wherein the formatting rule includes a formatting rule identifier dependent on a rule type associated with the formatting rule; and
    storing the formatting rule separately from the data content portion.

2. A method as claimed in claim 1 in which the data content portion comprises a copy-hole.

3. A method as claimed in claim 1 in which the data content portion comprises one of a text or image content portion.

4. A method as claimed in claim 3 in which the data content portion comprises the text content portion and the text content portion comprises at least one of a static or variable text content portion.

5. A method as claimed in claim 4 in which the text content portion comprises the variable text content portion and the variable text content portion comprises a field pointing to a data content location.

6. A method as claimed in claim 1 in which the rule type comprises one of a style, text or image rule type.

7. A method as claimed in claim 6 in which the formatting rule includes a formatting rule requirement.

8. A method as claimed in claim 7 further comprising generating a visual representation of the machine readable document template in which a data content portion to which a formatting rule is applied is designated with the corresponding formatting rule identifier.

9. A method as claimed in claim 8 in which the formatting rule identifier further indicates the formatting rule type, 10. A method as claimed in claim 1 further comprising binding a composed machine readable document template with data content and generating a machine readable document therefrom.

11. A method as claimed in claim 1 in which the data content and formatting rule are stored at separate locations.

12. A non-transitory computable readable medium containing instructions arranged to operate a processor to implement the method of claim 1.

13. An apparatus for composing a machine readable document template having a portion for inclusion of data content comprising a processor arranged to:
    generate a formatting rule applicable to data content for inclusion in the data content portion, wherein the formatting rule includes a formatting rule identifier dependent on a rule type associated with the formatting rule; and
    store the formatting rule separately from the data content portion.

14. A method of composing a machine readable document template having a portion for inclusion of data content comprising:
    generating a formatting rule applicable to data content for inclusion in the data content portion, in which the formatting rule has a formatting rule identifier that is dependent on a rule type associated with the formatting rule; and
    generating a visual representation of the machine readable document template in which a data content portion to which a formatting rule is applied is designated with the corresponding formatting rule identifier.

* * * * *

UNITED STATES PATENT AND TRADEMARK OFFICE
CERTIFICATE OF CORRECTION

PATENT NO. : 8,056,005 B2
APPLICATION NO. : 12/174984
DATED : November 8, 2011
INVENTOR(S) : Fabio Giannetti It is certified that error appears in the above-identified patent and that said Letters Patent is hereby corrected as shown below:

In column 8, lines 61-67, delete "Of course in all of the examples discussed the nature of the rule can be appropriate manner. For example nested style or text rules can be applied in conjunction with each other and the multiple style text rules can apply within a of any simplicity or complexity and multiple rules can be combined in any single data channel. Additionally the same rule can be applied in multiple locations." and
insert -- Of course in all of the examples discussed the nature of the rule can be of any simplicity or complexity and multiple rules can be combined in any appropriate manner. For example nested style or text rules can be applied in conjunction with each other and the multiple style text rules can apply within a single data channel. Additionally the same rule can be applied in multiple locations. --, therefor.

In column 10, line 14, in Claim 9, delete "type," and insert -- type. --, therefor.

Signed and Sealed this
Thirty-first Day of July, 2012

David J. Kappos
*Director of the United States Patent and Trademark Office*